United States Patent
Fabregas et al.

(10) Patent No.: US 10,150,479 B2
(45) Date of Patent: Dec. 11, 2018

(54) BATTERY STATE OF FUNCTION PREDICTION WITH SELF-LEARNING

(71) Applicant: Lear Corporation, Southfield, MI (US)

(72) Inventors: Antoni Ferre Fabregas, Valls (ES); David Gamez Alari, Valls (ES); Jose Antonio Canals Esteve, Valls (ES)

(73) Assignee: Lear Corporation, Southfield, MI (US)

( * ) Notice: Subject to any disclaimer, the term of this patent is extended or adjusted under 35 U.S.C. 154(b) by 172 days.

(21) Appl. No.: 15/255,462

(22) Filed: Sep. 2, 2016

(65) Prior Publication Data
US 2018/0065636 A1 Mar. 8, 2018

(51) Int. Cl.
*H02J 7/00* (2006.01)
*B60W 30/18* (2012.01)
*F02N 11/00* (2006.01)

(52) U.S. Cl.
CPC ....... *B60W 30/18018* (2013.01); *F02N 11/00* (2013.01)

(58) Field of Classification Search
CPC ........ F02N 2200/063; F02N 2200/064; H01M 10/48; B60W 30/18018
See application file for complete search history.

(56) References Cited

U.S. PATENT DOCUMENTS

| | | | |
|---|---|---|---|
| 6,885,951 B2 | 4/2005 | Richter | |
| 7,208,914 B2* | 4/2007 | Klang | G01R 31/3648 320/132 |
| 7,593,823 B2 | 9/2009 | Iwane et al. | |
| 7,741,805 B2* | 6/2010 | Zhang | B60R 16/033 320/104 |
| 7,743,649 B1* | 6/2010 | Salman | F02N 11/0859 73/114.59 |
| 8,159,228 B2 | 4/2012 | Ferre et al. | |
| 8,536,872 B2* | 9/2013 | Ueda | G01R 31/3624 320/132 |
| 8,770,165 B2* | 7/2014 | Mizuno | F02D 29/06 123/179.3 |
| 8,788,142 B2 | 7/2014 | Aliberti et al. | |
| 8,818,611 B2 | 8/2014 | Shin et al. | |

FOREIGN PATENT DOCUMENTS

WO 2012156603 A1 11/2012

* cited by examiner

*Primary Examiner* — Hai Huynh
*Assistant Examiner* — Gonzalo Laguarda
(74) *Attorney, Agent, or Firm* — Brooks Kushman P.C.

(57) ABSTRACT

A system for a vehicle having an engine and a battery includes a memory and a controller. The memory has a predicted current expected to be provided by the battery for restarting the engine during a cranking event. The controller is configured to predict a minimum voltage of the battery expected during the cranking event based on the predicted current and to update the predicted current in the memory as a function of the predicted current and an actual current actually provided by the battery for restarting the engine during the cranking event.

7 Claims, 3 Drawing Sheets

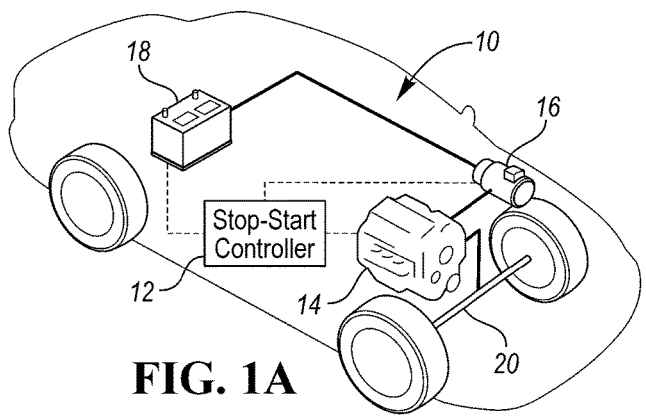
FIG. 1A
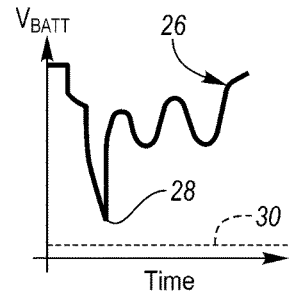
FIG. 2A
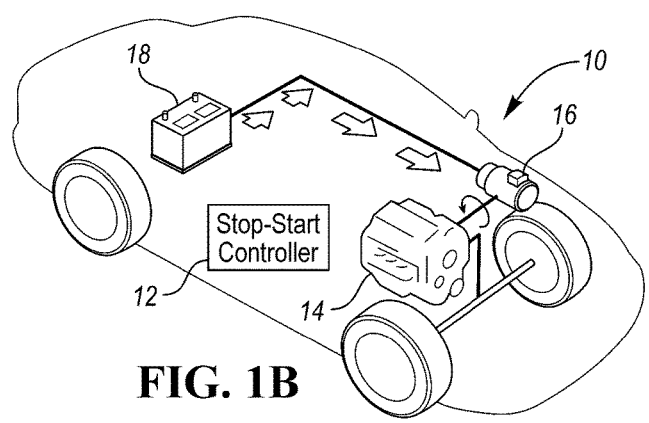
FIG. 1B
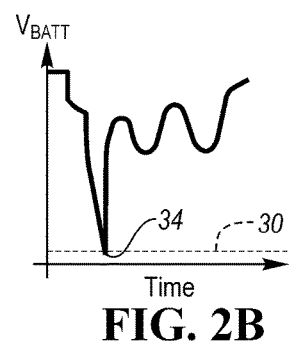
FIG. 2B
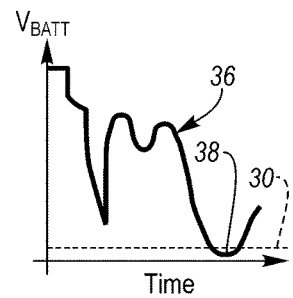
FIG. 2C
| Type \ T[°C] | -28 | -20 | 0 | 20 | 40 |
|---|---|---|---|---|---|
| Gasoline #1 | -345A | -287A | -219A | -185A | -185A |
| Gasoline #2 | -593A | -505A | -406A | -370A | -370A |
| Diesel #1 | -625A | -512A | -444A | -415A | -415A |
| Diesel #2 | -718A | -589A | -510A | -477A | -477A |
FIG. 3

(BACKGROUND)

BATTERY STATE OF FUNCTION PREDICTION WITH SELF-LEARNING

TECHNICAL FIELD

The present invention relates to predicting the State of Function (SoF) of a battery and, more particularly, to predicting the capability of a battery of a vehicle to start an engine of the vehicle in an engine cranking event.

BACKGROUND

The State of Function (SoF) of a battery is a measure of the capability of the battery being able to provide a minimum amount of energy at a given time.

A stop-start system of a vehicle automatically shuts off the engine of the vehicle when the vehicle is at rest, such as at a red traffic light, and automatically restarts the engine when the driver pushes the gas pedal to move the vehicle, such as at the traffic light turning green. Consequently, the amount of time the engine spends idling is reduced, thereby reducing fuel consumption and emissions.

The stop-start system operates a battery of the vehicle to provide electrical power to restart the engine after the engine has been shut off. The electrical power from the battery includes a cranking current to restart (i.e., crank) the engine.

The SoF of the battery is the capability of the battery to start the engine in an engine cranking event. The SoF of the battery should be monitored ahead of the engine being shut off to ensure that the battery will be able to restart the engine. Otherwise, the stop-start system could shut off the engine when the vehicle comes to a stop, such as at a red traffic light, without the battery being able to restart the engine, such as upon the traffic light turning green.

SUMMARY

An object includes predicting the State of Function (SoF) of a battery of a vehicle.

Another object includes predicting the SoF of a battery of a vehicle having a stop-start system.

A further object includes predicting the capability of a battery of a vehicle being able restart an engine of the vehicle in an engine cranking event.

Another object includes predicting the capability of a battery of a vehicle being able to restart an engine of the vehicle in an engine cranking event including learning characteristics (i.e., cranking) on the engine in various driving conditions and variations due to aging of the system (including battery aging).

A further object of the present invention includes predicting the capability of a battery of a vehicle being able to restart an engine of the vehicle in an engine cranking event including re-assessing a value of the internal resistance of the battery used in the prediction.

In carrying out at least one of the above and/or other objects, a system for a vehicle having an engine and a battery is provided. The system includes a memory and a controller. The memory has a predicted current expected to be provided by the battery for restarting the engine during a cranking event. The controller is configured to predict a minimum voltage of the battery expected during the cranking event based on the predicted current and to update the predicted current in the memory as a function of the predicted current and an actual current actually provided by the battery for restarting the engine during the cranking event.

The controller may be further configured to predict a minimum voltage of the battery expected during a next cranking event based on the updated predicted current and to update the updated predicted current in the memory as a function of the updated predicted current and an actual current actually provided by the battery for restarting the engine during the next cranking event.

The controller may be further configured to update the predicted current in the memory further as a function of the predicted current weighed by a factor $\alpha$ and the actual current weighted by a factor $(1-\alpha)$, where $0<\alpha<1$. The factor $\alpha$ may be less than 0.5 whereby the actual current is a greater contributor than the predicted current in updating the predicted current in the memory. The factor $\alpha$ may fall within the range $0.2 \leq \alpha < 0.5$.

The predicted current may be a function of predicted currents expected to be provided by the battery for restarting the engine during previous cranking events and actual currents actually provided by the battery for restarting the engine during the previous cranking events.

The controller may be further configured to enable the engine to be stopped ahead of the cranking event when the predicted minimum voltage of the battery is greater than a minimum voltage threshold and to prevent the engine from being stopped ahead of the cranking event when the predicted minimum voltage of the battery is less than the minimum voltage threshold.

The memory may have predicted currents expected to be provided by the battery for restarting the engine during the cranking event for a plurality of engine temperatures. In this case, the controller is further configured to predict the minimum voltage of the battery expected during the cranking event based on the predicted current corresponding to a temperature of the engine ahead of the cranking event.

The controller may be further configured to predict the minimum voltage of the battery expected during the cranking event based further on an internal resistance of the battery and to update a value of the internal resistance of the battery as a function of the actual current and an actual minimum voltage of the battery actually occurring during the cranking event.

The controller may be further configured to predict the minimum voltage of the battery expected during the cranking event based further on a predicted variation of a voltage of the battery due to current flowing from the battery between an instant at which the controller predicts the minimum voltage of the battery and an initiation of the cranking event.

Further, in carrying out at least one of the above and/or other objects, another system for a vehicle having an engine and a battery is provided. In this system, the controller is configured to predict a minimum voltage of the battery expected during the cranking event based on the predicted current and to update the predicted current in the memory as a function of the predicted current weighed by a factor $\alpha$ and the actual current weighted by a factor $(1-\alpha)$, where $0<\alpha<1$.

The controller may be further configured to calculate the factor $\alpha$ as a function of a difference between the predicted minimum voltage of the battery and an actual minimum voltage of the battery actually occurring during the cranking event.

Also, in carrying out at least one of the above and/or other objects, a method for a vehicle having an engine and a battery is provided. The method includes obtaining from a memory a predicted current expected to be provided by the battery for restarting the engine during a cranking event; predicting a minimum voltage of the battery expected during the cranking event based on the predicted current; and updating the predicted current in the memory as a function of the predicted current and an actual current actually provided by the battery for restarting the engine during the cranking event.

BRIEF DESCRIPTION OF THE DRAWINGS

FIG. 1A illustrates a block diagram of an exemplary vehicle having a stop-start system controller, the engine of the vehicle being shut off with the vehicle being stopped;

FIG. 1B illustrates a block diagram of the exemplary vehicle, the battery of the vehicle providing power to a starter motor of the vehicle to restart the engine upon the driver pushing the gas pedal to move the vehicle;

FIGS. 2A, 2B, and 2C each illustrate a respective model engine cranking current profile in the form of a plot of the battery terminal voltage over time during an engine cranking event;

FIG. 3 illustrates an exemplary look-up table of predicted engine cranking currents for different engine temperatures for models of different types of engines;

DETAILED DESCRIPTION

Figure 4:
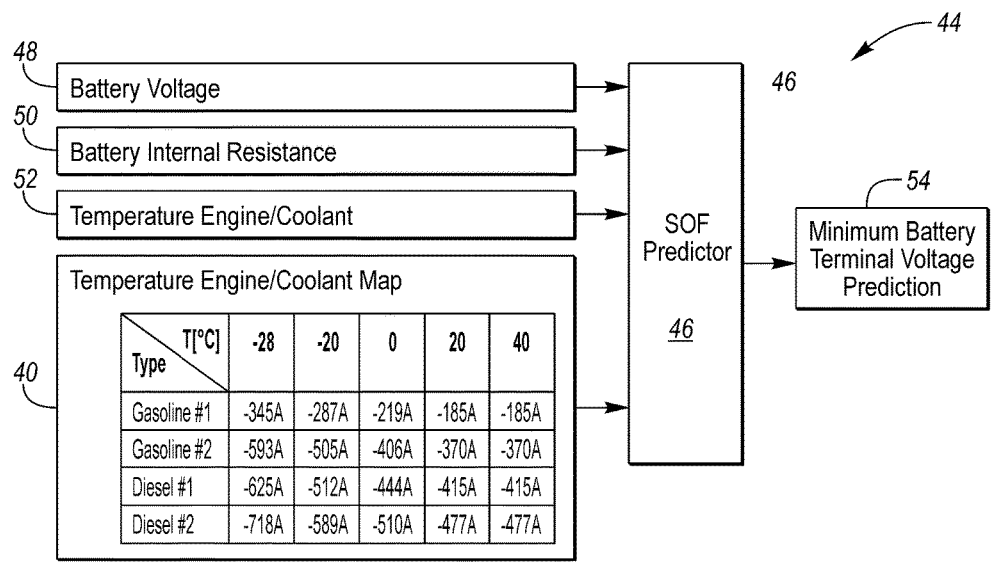
FIG. 4 illustrates a block diagram of a conventional system for predicting the State of Function (SoF) of a battery of a vehicle.

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring now to FIGS. 1A and 1B, block diagrams of an exemplary vehicle 10 having a stop-start system is shown. The stop-start system includes a stop-start system controller 12. Vehicle 10 further includes an engine 14, a starter motor 16, and a battery 18. Engine 14 is configured to generate engine power for driving drive wheels 20. Motor 16 is configured to provide the mechanical power to restart the engine 14.

Stop-start system controller 12 is configured to automatically shut off engine 14 when vehicle 10 is stopped such as at a red traffic light. Stop-start system controller 12 is further configured to cause battery 18 and motor 16 to operate to automatically restart engine 14 when the driver pushes the gas pedal to move the vehicle such as upon the red traffic light turning green. The operation includes battery 18 providing electrical power having a cranking current to motor 16. Motor 16 converts the electrical power into mechanical power and provides the mechanical power to engine 14 to restart the engine.

In FIG. 1A, stop-start system controller 12 shuts off engine 14 as vehicle 10 is stopped such as at a red traffic light. Engine 14 remains dormant with vehicle 10 at rest.

In FIG. 1B, stop-start system controller 12 operates motor 16 and battery 18 to cause the battery to provide electrical power 22 to the motor for the motor to start engine 14 such as upon the red traffic light turning green. Motor 16 converts electrical power 22 from battery 18 into mechanical power 24 and provides mechanical power 24 to engine 14 to start the engine. Stop-start system controller 12 operates motor 16 and battery 18 to start engine 14 in response to the driver pushing the gas pedal to move vehicle 10.

The State of Function (SoF) of battery 18 may be defined as the capability of the battery to start engine 14 in an engine cranking event. As such, the SoF of battery 18 is a measure of the capability of the battery being able to provide sufficient electrical power to motor 16 for starting engine 14.

Stop-start system controller 12 is configured to monitor the SoF of battery 18. Stop-start system controller 12 monitors the SoF of battery 18 ahead of shutting off engine 14 to ensure that the battery will be able to restart the engine. In particular, stop-start system controller 12 continuously measures the capability of battery 18 being able to restart engine 14.

This parameter of the capability of battery 18 being able to restart engine 14 is the SoF of the battery. This function is also called "Battery Terminal Voltage Prediction" since stop-start system controller 12 obtains it by estimating the minimum voltage expected to be present between the two terminals of battery 18 during an engine cranking event. The voltage present between the two terminals of battery 18 is referred to as the "battery terminal voltage." The minimum voltage present between the two terminals of battery 18 is referred to as the "minimum battery terminal voltage."

Usually, two different situations are considered: cold cranking; and warm cranking (warm cranking is needed for vehicles with stop-start functionality). "Cranking" refers to battery 18 providing electrical power (i.e., cranking current) to start or restart engine 14. An "engine cranking event" or "cranking event" refers to the occasion or procedure in which a start or restart attempt of engine 14 is conducted as a result of battery 18 being operated to provide the electrical power for starting or restating the engine.

If the minimum battery terminal voltage of battery 18 is expected to be below a minimum voltage threshold during an engine cranking event, then battery 18 will not be able to provide sufficient electrical power to restart engine 14 during the engine cranking event. Therefore, the engine management is informed ahead of engine 14 being shut off and the engine is prevented from being shut off such as when vehicle 10 stops at the next red traffic light.

Conventionally, the capability of battery 18 being able to provide sufficient electrical power for starting engine 14 is estimated by computing the minimum battery terminal voltage of the battery expected during an engine cranking event from a model engine cranking current profile for the engine. The model engine cranking current profile for engine 14 is stored in the memory of a battery monitoring system in association with stop-start system controller 12.

FIGS. 2A, 2B, and 2C each illustrate a respective model engine cranking current profile in the form of a plot of the battery terminal voltage over time during an engine cranking event. In FIG. 2A, battery terminal voltage 26 has a minimum battery terminal voltage 28 during the engine cranking event. Minimum battery terminal voltage 28 is greater than minimum voltage threshold 30. Accordingly, the model engine cranking current profile in FIG. 2A corresponds to a situation where battery 18 is capable to restart engine 14. In FIG. 2B, battery terminal voltage 32 has a minimum battery terminal voltage 34 during the engine cranking event. Minimum battery terminal voltage 34 is equal to minimum voltage threshold 30. Accordingly, the model engine cranking current profile in FIG. 2B corresponds to a situation where battery 18 is not capable of starting engine 14. In FIG. 2C, battery terminal voltage 36 has a minimum battery terminal voltage 38 during the engine cranking event. Minimum battery terminal voltage 38 is less than minimum voltage threshold 30. Accordingly, the model engine cranking current profile in FIG. 2C corresponds to a situation where battery 18 is not capable of starting engine 14.

A problem with using a model engine cranking current profile for engine 14 is that the engine is a physical component operating in a real-world environment as opposed to just being a model. For instance, engine 14, motor 16, and battery 18 all age with time causing the model engine cranking current profile to be inaccurate over time. As such, the model engine cranking current profile may differ from the real operating status of engine 14. This may lead to stop-start disabling when battery 18 is still capable of starting engine 14 and/or draining the battery too much leaving vehicle 10 stopped without the capability to crank engine 14 again. The latter case is highly problematic and essentially needs to be completely avoided. Further, although the latter case is clearly worse than the former case, the stop-start system should not be disabled too many times as engine 14 will spend more time idling contrary to the intended benefits of the stop-start system.

Accordingly, a more accurate estimation procedure for estimating the minimum battery terminal voltage of battery 18 expected during an engine cranking event is desired. Embodiments of the present invention provide enhanced methods and systems with self-learning to estimate the SoF of battery 18 for an engine cranking event (i.e., the capability of battery 18 being able to restart engine 14) based on previous engine cranking events and environmental conditions.

According to embodiments of the present invention, stop-start system controller 12 computes the (predicted) minimum battery terminal voltage $V_{BATT\_MIN\_PRED}$ (i.e., the SoF) of battery 18 expected during an engine cranking event according to the following equation:

$$V_{BATT\_MIN\_PRED} = V_{BATT\_INI} + \Delta V_{BATT\_CHG\_PRED} - R_{BATT\_INT} \cdot I_{ENG\_CRANK\_PRED} \quad (1)$$

where $V_{BATT\_INI} = V_{100} + S \Delta CHG_{MEAS}$ is the voltage of battery 18 (i.e., the voltage between the terminals of battery 18) at the precise moment of the engine start-ability computation is done, $V_{100}$ is the voltage of the fully charged battery, and $\Delta CHG_{MEAS}$ is the actual amount of charge extracted from the battery. If no battery current is flowing and battery 18 is stabilized, then this voltage corresponds to the open circuit voltage of battery 18.

$\Delta V_{BATT\_CHG\_PRED}$ is the predicted variation of the voltage of battery 18 due to battery current flowing between the precise instant of this computation and the engine cranking event and is computed according to the following equation:

$$\Delta V_{BATT\_CHG\_PRED} = S \cdot \Delta CHG_{PRED} \quad (2)$$

Figure 7:
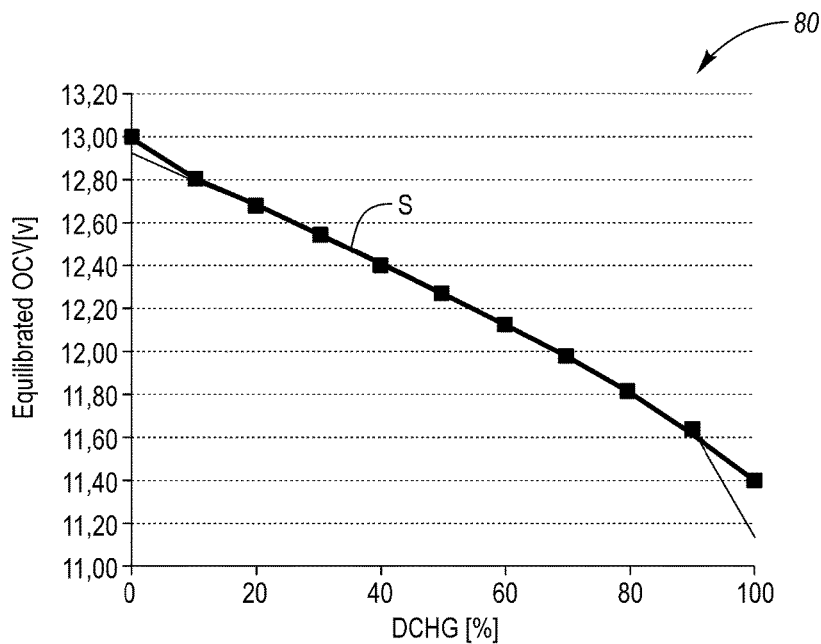
FIG. 7 illustrates an exemplary open circuit voltage versus discharge map (OCV-DCHG) map for the battery.

S is the slope of the open circuit voltage (OCV) versus Discharge (DCHG) map for battery 18. Turning briefly to FIG. 7, an exemplary OCV-DCHG map 80 for battery 18 is illustrated. OCV-DCHG map 80 is a plot of the OCV of battery 18 (in volts) versus the discharge of the battery (in %). The slope S is defined as the OCV versus Discharge (in %) map. The slope S can be obtained from OCV-DCHP map since there is a linear relationship between SOC and Discharge as follows:

DISCHARGE=0%→SOC=100%→battery fully charged

DISCHARGE=100%→SOC=0%→battery fully discharged $\Delta CHG_{PRED}$ is the predicted variation of charge of battery 18 due to current flowing between the precise instant of this computation and the engine cranking event.

$R_{BATT\_INT}$ is the internal battery resistance of battery 18 (the internal battery resistance may be computed by the method described in U.S. Pat. No. 8,159,228).

$I_{ENG\_CRANK\_PRED}$ is the predicted (or forecasted) engine cranking current, which depends on working conditions (i.e., engine temperature), during the engine cranking event.

The predicted engine cranking current is the engine cranking current that is expected to be provided by battery 18 to restart engine 14 during an engine cranking event. The predicted engine cranking current is obtained from a look-up table having information of predicted engine cranking currents versus engine temperatures for a model of engine 14. The look-up table is stored in the memory of the battery monitoring system.

Thus, if the engine temperature is "X" degrees, then the predicted engine cranking current corresponding to "X" degrees in the look-up table is the engine cranking current that is expected to be provided by battery 18 to restart engine 14 during an engine cranking event. Correspondingly, if the engine temperature is "Y" degrees, then the predicted engine cranking current corresponding to "Y" degrees in the look-up table is the engine cranking current that is expected to be provided by battery 18 to restart engine 14 during an engine cranking event.

A problem is that after some time the predicted engine cranking currents are not accurate because of changes in engine 14, motor 16, and/or battery 18 over time. Consequently, predicted minimum battery terminal voltages expected during engine cranking events subsequently computed according to the equation (1) are not accurate of the actual minimum battery terminal voltages actually occurring during the engine cranking events.

Referring now to FIG. 3, an exemplary look-up table 40 of predicted engine cranking currents for different engine temperatures for models of different types of engines is shown. Table 40 includes an entry, for example entry 42, for a model of engine 14. Entry 42 lists a series of predicted engine cranking currents for respective operating temperatures of engine 14. As such, in operation, the temperature of engine 14 is measured (e.g., 20° C.) and then the predicted engine cranking current (i.e., −185 A) corresponding to the measured engine temperature is obtained from table 40. The predicted engine cranking current (−185 A) is then used in the equation (1) to compute the predicted minimum battery terminal voltage that is expected during the engine cranking event.

In general, look-up table 40 could be enhanced by storing not only the maximum predicted engine cranking current expected during engine cranking, but a current profile with several predicted engine cranking current values. Of course, a trade-off exists between more values and memory occupation.

Referring now to FIG. 4, a block diagram of a conventional system 44 for predicting the SoF of battery 18 is illustrated. Conventional system 44 includes a SoF predictor 46 (e.g., a processor of stop-start system controller 12). SoF predictor 46 receives a value 48 of the battery voltage of battery 18 (i.e., a value of the summation of $V_{BATT\_INT}$ and $\Delta V_{BATT\_CHG\_PRED}$), a value 50 of the internal resistance of battery 18, and a value 52 of the temperature of engine 14 as sensed by a temperature sensor. SoF predictor 46 obtains from table 40 the predicted engine cranking current expected to be provided from battery 18 for restarting engine 14 during an engine cranking event in correspondence with the temperature of engine 14. SoF predictor 46 uses the equation (1) to compute a value 54 of the predicted minimum battery terminal voltage of battery 18 (i.e., the SoF of battery 18) expected during the engine cranking event from the voltage of battery 18, the internal battery resistance of battery 18, and the predicted engine cranking current.

While the predicted minimum battery terminal voltage value 54 is greater than minimum voltage threshold 30, stop-start system controller 12 stops engine 14 upon vehicle 10 stopping such as at a red traffic light. In this case, battery 18 is able to restart engine 14 so stop-start system controller 12 stops the engine. On the other hand, while the predicted minimum battery terminal voltage value 54 is less than minimum voltage threshold 30, stop-start system controller 12 does not stop engine 14 upon vehicle 10 stopping such as at a red traffic light. In this case, battery 18 is unable to restart engine 14 so stop-start system controller 12 does not stop the engine.

Figure 5:
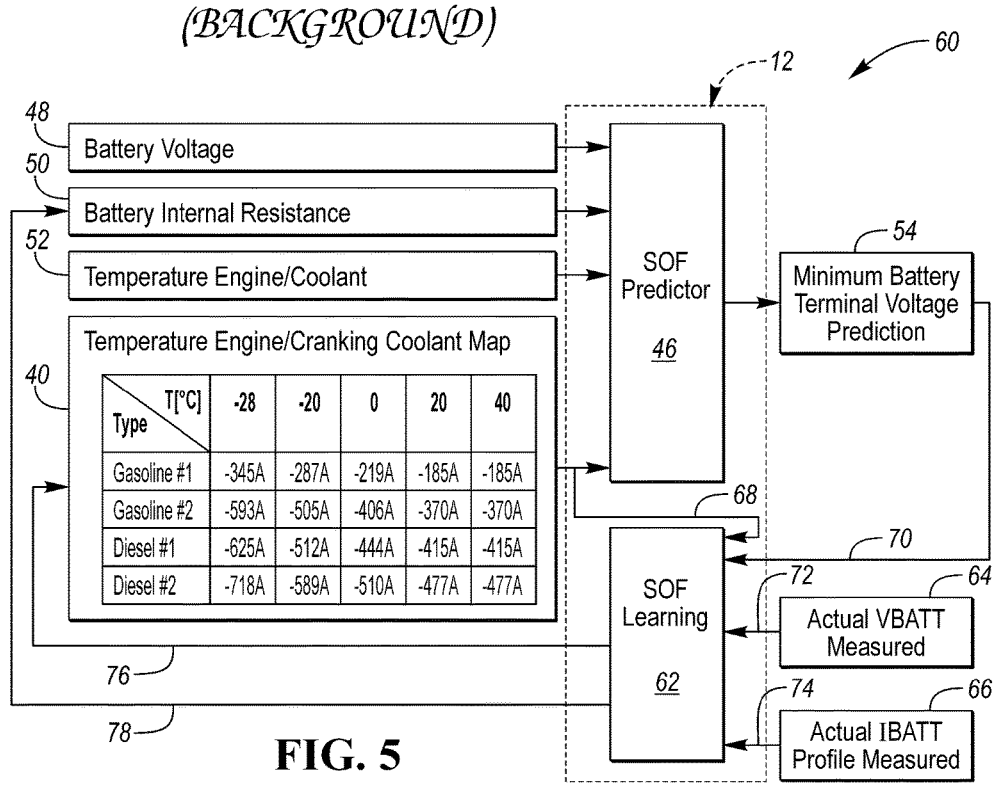
FIG. 5 illustrates a block diagram of a system for predicting the SoF of a battery of a vehicle in accordance with an embodiment of the present invention.

Referring now to FIG. 5, a block diagram of a system 60 for predicting the SoF of battery 18 in accordance with an embodiment of the present invention is shown. System 60 enhances the computation of the SoF of battery 18 by incorporating a mechanism to (i) learn the actual engine cranking current provided by battery 18 to restart engine 14 during engine cranking events and (ii) feedback the actual engine cranking current into look-up table 40. In this way, modifications in the engine cranking current profile due to changes in environment and/or system aging are incorporated in the computation of the SoF of battery 18. Consequently, more precise estimations of the SoF of battery 18 are obtained, especially over a long-term. System 60 can also re-compute the internal battery resistance $R_{BATT\_INT}$ and assess its value against the previously computed.

System 60 includes SoF predictor 46 and a SoF learner 62 (SoF predictor 46 and SoF learner 62 are implemented by a processor of stop-start system controller 12). SoF predictor 46 receives battery voltage value 48, internal battery resistance value 50, and engine temperature value 52. SoF predictor 46 accesses table 40 with engine temperature value 52 to obtain the predicted engine cranking current expected to be provided by battery 18 for restarting engine 14 during an engine cranking event. SoF predictor 46 uses the equation (1) to compute a predicted minimum battery terminal voltage value 54 of battery 18 expected during the engine cranking event.

As described above, stop-start system controller 12 stops engine 14 or does not stop the engine depending on whether predicted minimum battery terminal voltage 54 expected during the engine cranking event is greater than or less than minimum battery voltage 30.

When predicted minimum battery terminal voltage value 54 is greater than minimum voltage threshold 30, stop-start system controller 12 stops engine 14 upon vehicle 10 stopping such as at a red traffic light. Stop-start system controller 12 operates battery 18 and motor 16 to conduct an engine cranking event to restart engine 14 upon the traffic light turning green. The electrical power provided by battery 18 for restarting engine 14 during the engine cranking event includes the actual engine cranking current provided by the battery during the engine cranking event.

After the engine cranking event, the actual values of the variation of battery charge and the engine cranking current, as opposed to the predicted values used in equations (1) and (2), are available since they have been measured. In other words, these values are no longer predicted, but are actual measured values.

Therefore, the following are defined:

$V_{BATT\_MIN\_MEAS}$ is a value 64 of the measured (i.e., the actual) minimum battery terminal voltage of battery 18 during the engine cranking event;

$I_{ENG\_CRANK\_MEAS}$ is a value 66 of the measured (i.e., the actual) engine cranking current of battery 18 at working conditions during the engine cranking event; and $\Delta CHG_{MEAS}$ is a value of the actual) amount of charge extracted from battery 18.

Therefore, SoF learner 62 can compute the following:

$$V_{BATT\_INT} = V_{100} + S \cdot \Delta CHG_{MEAS} \qquad (3)$$

In operation, as shown in FIG. 5, SoF learner 62 receives the predicted engine cranking current expected to be provided from battery 18 for restarting engine 14 during an engine cranking event (at 68), the predicted minimum battery terminal voltage 54 expected during the engine cranking event (at 70), the measured minimum battery terminal voltage 64 actually occurring during the engine cranking event (at 72), and the measured engine cranking current 66 actually provided by the battery for restarting engine 14 during the engine cranking event (at 74). SoF learner 62 feedbacks the measured engine cranking current 66 into table 40 (at 76) as described in greater detail below. SoF learner 62 also re-computes the internal battery resistance and assesses its value against previously computed internal battery resistance (at 78) as described in greater detail below.

Figure 6:
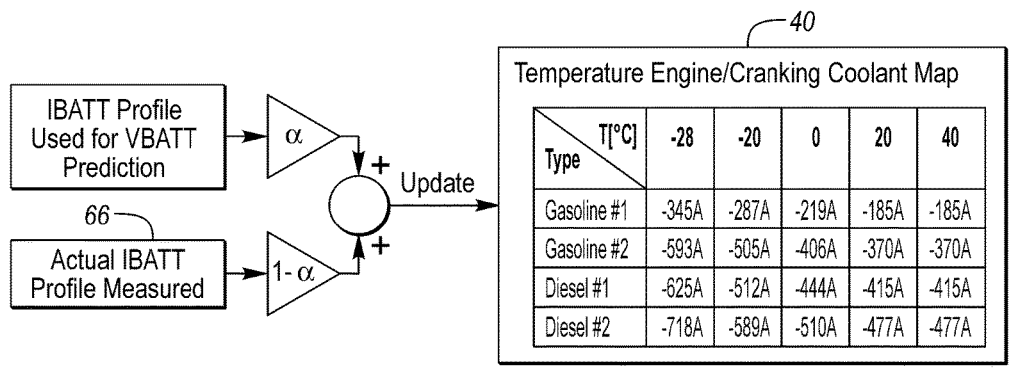
FIG. 6 illustrates a block diagram regarding operation of the system for predicting the SoF of a battery of a vehicle in accordance with an embodiment of the present invention.

With reference to FIG. 6, SoF learner 62 employs the following operation in feeding back measured engine cranking current 66 into table 40 (at 76). SoF learner 62 updates the predicted engine cranking current profile in table 40 using the most recent predicted engine cranking current set forth in table 40 and the measured engine cranking current 66. The most recent predicted engine cranking current is the predicted engine cranking current expected to be provided from battery 18 for restarting engine 14 during the engine cranking event (labeled "IBATT Profile Used for VBATT Prediction" in FIG. 6). The measured engine cranking current 66 is the actual engine cranking current actually provided by battery 18 for restarting engine 18 during the cranking event (labeled "Actual IBATT Profile Measured" in FIG. 6).

In the operation according to FIG. 6, SoF learner 62 updates the predicted engine cranking current in table 40 as a function of the predicted engine cranking current weighted by a factor $\alpha$ and the actual engine cranking current 66 weighted by a factor $(1-\alpha)$. The factor $\alpha$ is a predefined value falling within a range $0 < \alpha < 1$.

The predicted engine cranking current and the actual engine cranking current 66 influence the updating of the predicted engine cranking current in table 40 differently depending on the value of the factor $\alpha$. For instance, when the value of the factor $\alpha$ is 0.5 both the predicted engine cranking current and the actual engine cranking current 66 contribute the same to updating the predicted engine cranking current in table 40. As the value of the factor $\alpha$ moves from 0.5 toward 0 the actual engine cranking current 66 is weighted more heavily than the predicted engine cranking current in updating the predicted engine cranking current in table 40. On the other hand, as the value of the factor α moves from 0.5 toward 1.0 the predicted engine cranking current is weighted more heavily than actual engine cranking current 66 in updating the predicted engine cranking current in table 40. In an embodiment, the value of the factor α falls within a range 0.2<α<0.5 whereby the actual engine cranking current 66 is weighted more heavily than the predicted engine cranking current in updating the predicted engine cranking current in table 40.

The operation shown in FIG. 6 is done for each engine cranking event as the engine cranking events occur over time. The predicted engine cranking current is updated in table 40 for each engine cranking event. For instance, in a current engine cranking event, SoF learner 62 updates the predicted engine cranking current in table 40 as a function of the predicted engine cranking current for the current engine cranking event and the actual engine cranking current 66 occurring during the current engine cranking event. Table 40 is thus modified to include an updated predicted engine cranking current. In a next subsequent engine cranking event, SoF learner 62 updates the updated predicted engine cranking current in table 40 as a function of the updated predicted engine cranking current for the next subsequent engine cranking event and the actual engine cranking current 66 occurring during the next subsequent engine cranking event. In this way, the predicted cranking current in table 40 at any given time is a function of predicted cranking currents for previous cranking events and actual engine cranking currents 66 occurring during these previous cranking events.

The described operation in FIG. 6 implements infinite impulse response (IIR) filtering. This strategy is done to reduce the effect of noise of wrong measures in the computation of the engine cranking current profile to be updated. This strategy could be easily modified to include several measured data or several historic data into the computation of the engine cranking current profile to be updated.

SoF learner 62 also re-computes a new value of the internal battery resistance of battery 18 ($R_{BATT\_INT\_NEW}$) as:

$$R_{BATT\_INT\_NEW} = \frac{V_{BATT\_MIN\_MEAS} - V_{BATT\_INI}}{I_{ENG\_CRANK\_MEAS}} \quad (4)$$

SoF predictor 46 uses the new value of the internal battery resistance when using the equation (1) to estimate the predicted minimum battery voltage for the next engine cranking event.

The method can be applied to engine cranking current profiles, $I_{ENG\_CRANK} = I_{ENG\_CRANK}(t)$, using a "discretization" of $I_{ENG\_CRANK}$ in time intervals $\Delta t = \text{Duration}\_I_{ENG\_CRANK}/N$, where N is a parameter and apply the method to the current profile. In this case:

$$V_{BATT\_MIN\_PRED}(\Delta t) = V_{BATT\_INI} + \Delta V_{BATT\_CHG\_PRED}(\Delta t) - R_{BATT\_INT} I_{ENG\_CRANK\_PRED}(\Delta t) \quad (5)$$

In this case, look-up table 40 will store current profiles with N values each for each temperature condition.

A measure of the "quality" of the prediction $Q_{SOF}$ (in %) may be calculated as:

$$Q_{SOF} = \frac{|V_{BATT\_MIN\_MEAS} - V_{BATT\_MIN\_PRED}|}{V_{BATT\_MIN\_MEAS}} \times 100 \quad (6)$$

This information is used to check whether the system is functioning satisfactorily. If $Q_{SOF}$ is higher than a predefined threshold, then a warning is generated.

As described, the factor α is a predefined value falling within a range 0<α<1. In an alternate embodiment, SoF learner 62 computes the value α based on the accuracy of the battery terminal voltage prediction. SoF learner 62 computes the value α using a pre-determined function f(error)=f(ε). This function is such that α=1 when the predicted minimum battery terminal voltage 54 is equal to the measured minimum battery terminal voltage 64. Correspondingly, α→0 as the difference between the predicted minimum battery terminal voltage 54 and the measured minimum battery terminal voltage 64 increases.

While exemplary embodiments are described above, it is not intended that these embodiments describe all possible forms of the present invention. Rather, the words used in the specification are words of description rather than limitation, and it is understood that various changes may be made without departing from the spirit and scope of the invention. Additionally, the features of various implementing embodiments may be combined to form further embodiments of the present invention.

What is claimed is:

1. A system for a vehicle having an engine and a battery, comprising: a memory having a predicted current expected to be provided by the battery for restarting the engine during a cranking event; and a vehicle controller configured to predict a minimum voltage of the battery expected during the cranking event based on the predicted current and to update the predicted current in the memory as a function of the predicted current weighed by a factor α and an actual current actually provided by the battery for restarting the engine during the cranking event weighted by a factor (1−a), where 0<a<1; wherein the vehicle controller is further configured to enable the engine to be stopped ahead of the cranking event when the predicted minimum voltage of the battery is greater than a minimum voltage threshold and to prevent the engine from being stopped ahead of the cranking event when the predicted minimum voltage of the battery is less than the minimum voltage threshold; and wherein the vehicle controller is further configured to predict a minimum voltage of the battery expected during a next cranking event based on the predicted current and to update the predicted current in the memory as a function of the predicted current weighed by the factor a and an actual current actually provided by the battery for restarting the engine during the next cranking event weighted by the factor (1−a).

2. The system of claim 1 wherein:
the factor α is less than 0.5 whereby the actual current is a greater contributor than the predicted current in updating the predicted current in the memory.

3. The system of claim 2 wherein:
the factor α is within a range 0.2≤α<0.5.

4. The system of claim 1 wherein:
the predicted current is a function of predicted currents expected to be provided by the battery for restarting the engine during previous cranking events and actual currents actually provided by the battery for restarting the engine during the previous cranking events.

5. The system of claim 1 wherein:
the vehicle controller is further configured to predict the minimum voltage of the battery expected during the cranking event based further on an internal resistance of the battery and to update a value of the internal resistance of the battery as a function of the actual current and an actual minimum voltage of the battery actually occurring during the cranking event.

6. The system of claim 1 wherein:
the vehicle controller is further configured to predict the minimum voltage of the battery expected during the cranking event based further on a predicted variation of a voltage of the battery due to current flowing from the battery between an instant at which the controller predicts the minimum voltage of the battery and an initiation of the cranking event.

7. The system of claim 1 wherein:
the vehicle controller is further configured to calculate the factor $\alpha$ as a function of a difference between the predicted minimum voltage of the battery and an actual minimum voltage of the battery actually occurring during the cranking event.

* * * * *